April 28, 1931.    H. SCHLAICH    1,803,211
INDICATING INSTRUMENT
Filed Oct. 27, 1925
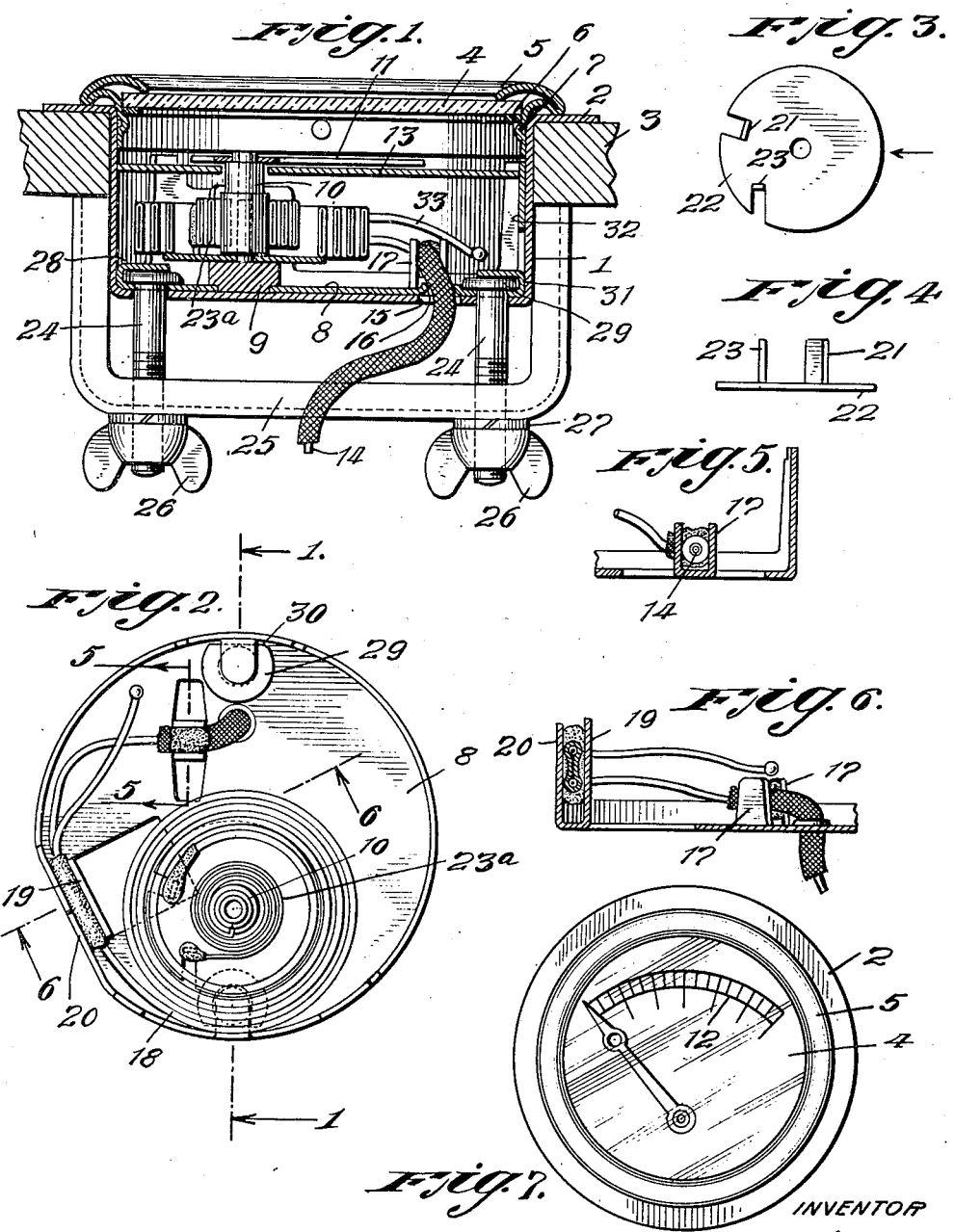
INVENTOR
Herman Schlaich
BY Moses & Nolte
ATTORNEYS Patented Apr. 28, 1931

1,803,211

UNITED STATES PATENT OFFICE

HERMAN SCHLAICH, OF LONG ISLAND CITY, NEW YORK

INDICATING INSTRUMENT

Application filed October 27, 1925. Serial No. 65,092.

This invention relates to pressure operated indicating instruments and is shown by way of illustration as embodied in a distance type thermometer.

Instruments of this type ordinarily include a pressure responsive operating means such as a Bourdon coil, an indicator element operable by the coil and a compensating spring interposed between the Bourdon coil and the indicator element to prevent erroneous indications due to variations in temperature of the Bourdon coil itself. The compensating spring is necessarily a delicate and fragile member and, as instruments of this class have been manufactured in the past, it has been very likely to become disarranged if violently jolted, as when the instrument was dropped or roughly handled. It is an important object of the present invention to provide bracing means for guarding the delicate compensating spring so that the instrument will not be shaken out of calibration, as heretofore, when subjected to vibration, jolting, or other rough treatment.

It is a further object of the invention to simplify the construction and assembly of the instrument parts and thereby to reduce the cost of manufacture and increase the durability of the instrument.

Other objects and advantages will hereinafter appear.

In the drawing:

Figure 1 is a central sectional elevation through the instrument on the line 1—1 of Figure 2;

Figure 2 is a plan view of the back plate with the operating mechanism assembly thereon;

Figure 3 is a detail plan view of a bracing plate used for guarding the compensating spring and connecting it to the Bourdon coil;

Figure 4 is an elevation of the plate shown in Figure 3;

Figure 5 is a section on the line 5—5 of Figure 2 looking in the direction of the arrows;

Figure 6 is a section on the line 6—6 of Figure 2 looking in the direction of the arrows; and Figure 7 is a front elevation of the instrument.

The distance type thermometer shown as illustrating one embodiment of the present invention comprises a casing 1 having a flange 2 at its forward edge which fits against the front face of an instrument board 3. A face glass 4 is secured in a holding frame 5 in any suitable manner as by a ring 6 which engages an internal shoulder 7 on the frame. The frame 5 is fitted into the forward end of the casing 1 and defines a chamber therewith in which the operating mechanism is housed.

It is a point that this operating mechanism is all mounted upon a unitary back plate 8 prior to its insertion in the instrument casing, to form an operating mechanism unit which may be inserted as a whole into the casing. The back plate 8 has riveted therein a bearing pin 9 which projects forwardly in the casing and constitutes a bearing for a shaft 10 that carries an indicator hand 11 for cooperating with a scale 12 upon a dial 13.

A capillary tube 14 is led through openings 15 and 16 formed in the instrument casing 1 and in the back plate 8, respectively, to the interior of the instrument and is soldered to the back plate between upstanding ears 17 struck from the back plate. The capillary tube is connected to the outer end of a Bourdon coil 18 which is anchored, by soldering, between an ear 19 integral with the back plate and a wall 20 also integral with the back plate. The Bourdon coil constitutes an involute spiral of several turns and has its inner end secured by soldering to a lug 21 formed on a centre plate 22 which is pivotally mounted on bearing pin 9. The outer end of a flat spiral compensating spring, here shown as an involute spiral compensating spring 23a is likewise soldered to an upstanding lug 23 on the centre plate 22.

With the construction described the centre plate constitutes an operative connecting means between the Bourdon coil and the compensating spring for transmitting the force of the former to the latter. The plate absolutely compels the inner end of the Bourdon coil and the outer end of the compensating spring to move in circular paths so that the pull transmitted from either of them to the other is caused to act always at the same effective angle. This control of the expansion and contraction of the Bourdon coil and of the compensating spring also prevents these elements from deviating from their intended spiral form, and hence helps to cause equal increments of force to result in equal variations throughout the entire operating range.

It is a further important point that the centre plate constitutes a brace for the delicate compensating spring which prevents the spring from being permanently distorted when the instrument is roughly handled.

Provision is made of securing bolts 24 which pass through the back plate 8 and through the back of the casing 1 for securing the instrument to a support. As shown herein the support consists of a bridge 25 bearing against the back of the instrument board 3, to which the bolts are held by wing nuts 26 secured against rotation by lock washers 27. It is important that these securing bolts 24 be held against intrusion within the instrument casing far enough to engage and injure the operating parts such as the Bourdon tube, centre plate, etc. Provision is accordingly made of overturned ears 28 on the back plate for overlying the heads 29 of the bolts to secure them against longitudinal movement. The bolts and back plate are also designed for cooperation to prevent rotation of the bolts. For this purpose each bolt head 29 has a flat side 30 which lies adjacent to an upstanding wall 31 on the back plate. Engagement of the flat side 30 of the bolt head with the wall 31 holds the bolts against rotation while the wing nuts 26 are being tightened.

The back plate also has forwardly extending notched walls or projections 32 for cooperating with notches in the dial 13 to hold the dial in place.

In assembling the parts of the instrument described the bolts 24 may be first inserted through the back plate, and ears 28 may be bent down over them. The pivot pin 9 may then be riveted in place and the centre piece 22 with the Bourdon coil and compensating spring secured to it may be put in place. The outer end of the Bourdon coil may then be soldered to the back plate. The capillary tubing is next passed through the opening 16 in the back plate and connected by soldering to the Bourdon coil. It is also soldered between the ears 17 of the back plate to anchor it. This completes the assembly of the operating mechanism unit which is now ready to have the Bourdon coil and the capillary tubing as well as the temperature responsive element, not shown, filled with a temperature responsive fluid through a filling tube 33.

When the fluid has been inserted and the filling tube sealed the operating mechanism may be inserted in the instrument casing by passing the temperature responsive element and the capillary tubing through the opening 15 in the back of the casing and by passing the bolts 24 through the back of the casing. The dial is next snapped into position on the forwardly projecting arms 32 of the back plate and the indicator hand is then placed on the shaft 10. The assembly is completed by securing the casing 5 in place.

Variations may be resorted to within the scope of the invention and parts of the improvements may be used without others.

What I claim is:

1. In an indicating instrument, having a casing and operating mechanism in the casing, a back plate in the casing on which the operating mechanism is mounted, members extending through the back plate for securing the instrument to a support, and ears formed on the back plate for overlying the inner ends of said securing members and preventing intrusion of the securing members far enough within the instrument to injure said operating mechanism.

2. In an indicating instrument, having a casing and operating mechanism in the casing, a back plate in the casing, and means for securing the instrument to a support comprising a bolt having its shank extended through the back plate and a flat sided head at the inner side of the back plate, said back plate having an upstanding portion to engage the flat side of the bolt head and hold it against rotation, and an over-turned ear to overlie the head of the bolt and prevent farther intrusion of the bolt within the instrument casing.

3. In a pressure responsive indicating instrument having a casing, means for connecting the instrument to a support, operating mechanism within the casing, and capillary tubing connected with said operating mechanism, a back plate within the casing, said back plate having an anchorage for the capillary tubing formed integrally with it, and also constituting a support for the operating mechanism, and means on the back plate guarding the operating mechanism against injury by the means for connecting the instrument to its support.

4. In a pressure responsive indicating instrument having a capillary tubing, a casing, an operating mechanism unit insertible in said casing as a whole, comprising a dial, an indicating hand and operating mechanism for the indicating hand including a Bourdon coil, a back plate forming part of said unit on which the other parts of the unit are all mounted, said back plate comprising means integral therewith for anchoring the Bourdon coil and for anchoring the capillary tubing and means also integral therewith for holding the dial.

5. An instrument as set forth in claim 4 in which the operating mechanism unit also includes securing bolts insertible through the back of the instrument casing and the back plate includes means integral therewith to prevent longitudinal movement of the bolts.

6. In a pressure operated indicating instrument, a casing, a Bourdon coil within said casing, and a flat spiral compensating spring disposed within said casing substantially coaxially with said Bourdon coil, in combination with a centre plate pivotally connected within said casing substantially coaxially with said coil and said spring, said plate constituting an operative connecting means between said Bourdon coil and said compensating spring for transmitting the force of the former to the latter.

In testimony whereof I have affixed my signature to this specification.

HERMAN SCHLAICH.